P. G. BLOMBERG.
DRILL SOCKET.
APPLICATION FILED JUNE 4, 1910.
988,302.
Patented Apr. 4, 1911.
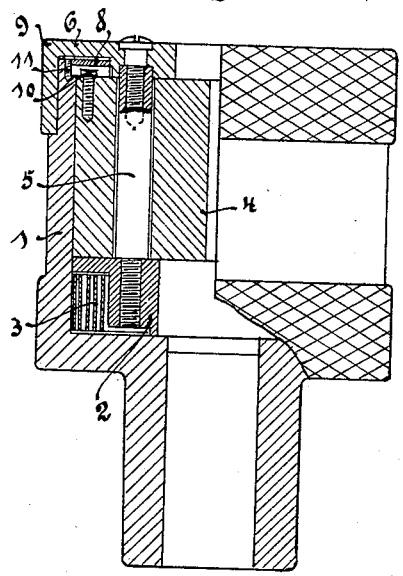
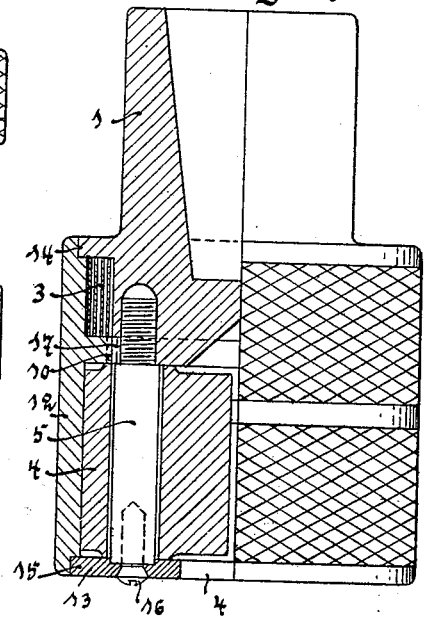
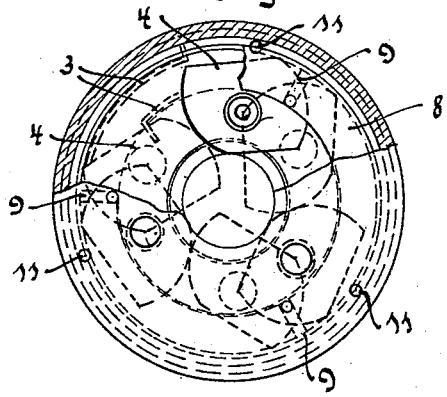
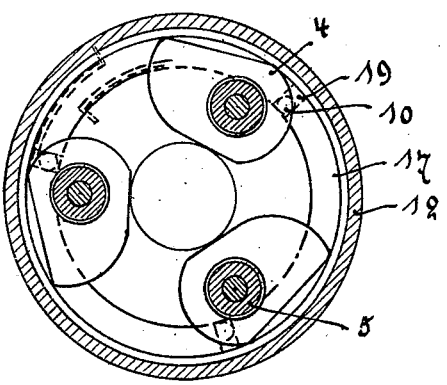
Witnesses:
Inventor:
Per Gotthard Blomberg

UNITED STATES PATENT OFFICE.

PER GOTTHARD BLOMBERG, OF LILJEHOLMEN, NEAR STOCKHOLM, SWEDEN, ASSIGNOR TO THE FIRM OF MEYER & KLEIN, OF HAGEN, I. W. GERMANY.

DRILL-SOCKET.

988,302.

Specification of Letters Patent.      Patented Apr. 4, 1911.

Application filed June 4, 1910.   Serial No. 564,983.

*To all whom it may concern:*

Be it known that I, PER GOTTHARD BLOMBERG, a subject of the King of Sweden, and resident of Liljeholmen, near Stockholm, Sweden, have invented certain new and useful Improvements in Drill-Sockets, of which the following is a specification.

The present invention relates to a drill socket or chuck of the kind comprising two rotatably connected members, and gripping jaws pivoted to one of said members and provided with studs guided in radiating slots in the other member, so that a rotary displacement effects a turning of the jaws about their pivots for increasing or diminishing the space between the gripping surfaces, the members being connected by a spring tending to hold the jaws in closed position.

The object of the invention is to simplify the manufacture of chucks of this kind, and for that purpose, the jaws, which are formed with an all through uniform cross-section, are adapted to roll along a cylindrical surface and to bear against said surface when gripping, the pivots being intended only to maintain the jaws in their proper position relative to each other and therefore fitted in the same so as to allow a certain amount of free play. From this arrangement it follows that the construction of the chuck is greatly facilitated, since the tapping of the jaws for the reception of the pivots need not be done with any great accuracy. Moreover, the turning of the cylindrical surface is a simple operation, and the jaws, which must be of equal shape, can simply be cut out of an evenly rolled bar.

In the accompanying drawings are illustrated two forms of construction of my improved drill socket and like letters of reference refer to like parts throughout the various views.

Figure 1 shows a longitudinal cross-section of the drill socket, Fig. 2, a horizontal cross-section of Fig. 1, and Figs. 3 and 4, a modification of the construction shown in Figs. 1 and 2.

According to Figs. 1 and 2 the pins 5, on which the jaws 4 are loosely mounted, are fastened with their ends in two rings 2 and 6. Said rings are rotatably mounted in the casing 1. A spring 3, connected with one end to the casing 1 and with the other end to the ring 2, tends to turn the parts 2, 5, 6, in such a direction that the jaws close around the drill. In order to easily turn said parts in the opposite direction, the ring 6 is formed in the shape of a cap overlapping the top ends of the casing 1. The jaws 4 must roll on the cylindrically turned inner face of the casing and are not permitted to glide. In order to securely prevent the gliding each jaw is provided with a pin 10 gliding in a radial groove of a slot 9. In the illustrated construction said grooves are arranged in a ring 8 fixed to the mouth of the casing 1 by means of screws 11.

The construction shown in Figs. 3 and 4 differs from the one above described in that the pins 5 are connected to the fixed part of the socket. The side wall of the casing is freely mounted and form a rotatable shell 12 on the fixed part of the socket. The shell 12 is connected with the spring 3 and is provided with grooves or slots for the pins 10 of the jaws. By this the ring 8 as well as the ring 2 becomes superfluous and the rotatable cover can be replaced by a fixed ring 13 preventing the dropping of the jaws out of the socket. The ring 13 is fixed to the pin 5 by means of screws 16. The shell 12 has circular recesses 14 and 15 in its ends, the recess 14 being engaged by a flange on the part 1, and the recess 15 by the ring 13, so as to prevent axial displacement of the shell. It is also provided with an inner flange 17 having radial slots in which the pins 10 of the jaws 4 are guided. The flange 17 can be replaced either by a ring wedged into the shell 12, or by means of forks or double pins fixed to said shell or by any other suitable means. Of course the pins and slots can be exchanged with each other so that the shell carries the pins and the jaws have the slots.

In the construction shown in Figs. 3 and 4 drills can be exchanged without stopping the engine driving the drill socket.

I claim:—

1. A drill socket comprising two rotatably connected members, one member having an internal cylindrical surface, longitudinally disposed pins connected to the other member and projected through the interior of the first member, tapped gripping jaws, having an all through uniform cross-section, mounted on said pins so as to have a certain amount of free play, means for causing the jaws to roll on said cylindrical surface so as to increase and diminish the space between the gripping surfaces when the members are rotatably displaced, and means for holding the jaws normally in closed position, substantially as set forth.

2. A drill socket comprising a head, a loose shell rotatably fitted with one end on a flange of the same, longitudinally disposed pins connected to the head and projected through the interior of the shell, a ring connecting the outer ends of the pins and guiding the outer end of the shell, tapped gripping jaws mounted on said pins so as to have a certain amount of free play and so as to bear against the cylindrical surface of the shell when gripping, an interior flange with radial slots in the shell, studs on the gripping jaws engaging said slots so as to cause the jaws to roll on the cylindrical surface of the shell for increasing and diminishing the space between the gripping surfaces when the shell is rotated on the head, and a spiral spring connected with one end to the shell and with the other end to the head so as to hold the jaws normally in closed position, substantially as set forth.

In testimony whereof I have hereunto signed my name this 11th day of May 1910, in the presence of two subscribing witnesses.

PER GOTTHARD BLOMBERG.

Witnesses:
  NORVALD NYSTROM,
  HEDWIG MELINDER.

---

Copies of this patent may be obtained for five cents each, by addressing the "Commissioner of Patents, Washington, D. C."